United States Patent
Tanaka et al.

(10) Patent No.: US 11,006,349 B2
(45) Date of Patent: May 11, 2021

(54) COMMUNICATION SYSTEM AND PROGRAM UPDATE METHOD

(71) Applicant: LAPIS Semiconductor Co., Ltd., Yokohama (JP)

(72) Inventors: Yoshiyuki Tanaka, Yokohama (JP); Naotaka Saito, Yokohama (JP); Eiichi Saito, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 16/516,274

(22) Filed: Jul. 19, 2019

(65) Prior Publication Data

US 2020/0045616 A1   Feb. 6, 2020

(30) Foreign Application Priority Data

Jul. 31, 2018  (JP) .............................. JP2018-143328

(51) Int. Cl.

| *H04W 48/10* | (2009.01) |
| *H04W 48/16* | (2009.01) |
| *G06F 8/65*  | (2018.01) |
| *H04W 72/00* | (2009.01) |

(Continued)

(52) U.S. Cl.
CPC .............. *H04W 48/10* (2013.01); *G06F 8/65* (2013.01); *H04W 48/16* (2013.01); *H04W 72/005* (2013.01); *H04W 72/121* (2013.01); *H04W 56/0015* (2013.01)

(58) Field of Classification Search
CPC ... H04W 48/10; H04W 48/16; H04W 72/005; H04W 72/121; H04W 56/0015; H04W 8/245; G06F 8/65; H04L 12/18; H04L 67/34
See application file for complete search history.

(56) References Cited

U.S. PATENT DOCUMENTS

| 10,558,819 B2 * | 2/2020 | Resch .................... G06F 21/602 |
| 2009/0235244 A1 * | 9/2009 | Enomori ............. H04L 12/2814 |
| | | 717/170 |

(Continued)

FOREIGN PATENT DOCUMENTS

JP         2008288978        11/2008

*Primary Examiner* — Brian T O Connor
(74) *Attorney, Agent, or Firm* — JCIPRNET

(57) ABSTRACT

The disclosure provides a communication system and a program update method. In a communication system according to the disclosure, when a host device updates a program stored in each of a plurality of communication terminals, first, the host device transmits a distribution preparation completion signal by broadcast. Each of the plurality of communication terminals transmits a start request signal to the host device in response to reception of the distribution preparation completion signal. The host device transmits a permission signal for giving a right for performing a data request to one communication terminal that has transmitted the start request signal earliest. The one communication terminal transmits a data request signal to the host device in response to reception of the permission signal. The host device transmits the update program data by broadcast to the plurality of communication terminals in response to reception of the data request signal.

9 Claims, 13 Drawing Sheets

(51) Int. Cl.
    *H04W 72/12* (2009.01)
    *H04W 56/00* (2009.01)

(56) References Cited

U.S. PATENT DOCUMENTS

| | | | |
|---|---|---|---|
| 2015/0235015 A1* | 8/2015 | Holler | G06F 21/121 |
| | | | 726/27 |
| 2016/0196132 A1* | 7/2016 | Searle | H04L 41/082 |
| | | | 717/173 |
| 2017/0024128 A1* | 1/2017 | Beale | G06F 3/0664 |
| 2019/0065525 A1* | 2/2019 | Malhotra | G06F 12/1081 |
| 2020/0151384 A1* | 5/2020 | Warila | G06F 16/986 |

\* cited by examiner

COMMUNICATION SYSTEM AND PROGRAM UPDATE METHOD

CROSS-REFERENCE TO RELATED APPLICATION

This application claims the benefit of Japan Application No. 2018-143328, filed on Jul. 31, 2018. The entirety of the above-mentioned patent application is hereby incorporated by reference herein and made a part of this specification.

BACKGROUND

Technical Field

The disclosure relates to a communication system including a plurality of communication terminals and a host device that communicates with each of the communication terminals, and a method of updating a program stored in each of the communication terminals.

Description of Related Art

At present, a communication system in which a plurality of wireless communication terminals called sensor nodes on which sensors are mounted are disposed, and sensing information detected by the sensors of each of the sensor nodes is provided to a management server through a wireless relay node and a communication network has been proposed. Each of sensor nodes includes a memory in which a program is stored, and a microprocessor that performs control for acquisition of the sensing information and the communication described above according to the program.

Incidentally, it is necessary to update the program stored in the memory of each of the sensor nodes to a new program in a case in which a problem is discovered, a function changes, or the like.

Therefore, a communication system for performing an update process of a program for each sensor node in wireless communication has been proposed (for example, refer to Japanese Patent Laid-Open No. 2008-288978 (Patent Document 1)).

In the communication system, among the plurality of sensor nodes, a sensor node on which the update process of the program is required to be performed individually performs a data transmission request to a gateway of a transmission source of an update program. The gateway wirelessly transmits update program data to the sensor node that has performed the data transmission request.

Therefore, in the communication system described above, distribution of the program data is performed by one-to-one wireless communication between the gateway and each sensor node.

Therefore, in a case in which the number of sensor nodes on which the program is to be updated is large, a problem that it takes a time to complete the program update for all the sensor nodes occurs. In particular, in a communication system using a communication band having a limited total transmission time, since a total time spent for program update becomes long, communication efficiency is reduced at a gateway of a transmission source of update program data.

SUMMARY

A communication system according to the disclosure includes a plurality of communication terminals each having a memory storing program data in charge of information communication, and a host device that communicates with the plurality of communication terminals. Each of the communication terminals transmits a start request signal to the host device in a case in which a distribution preparation completion signal indicating that preparation for distribution of update program data is completed is received from the host device, and transmits a data request signal to the host device in a case in which a permission signal for giving a right for performing a data request is received from the host device, and the host device transmits the distribution preparation completion signal by broadcast, then transmits the permission signal to one communication terminal that has transmitted the start request signal earliest among the plurality of communication terminals, and transmits the update program data by broadcast to the plurality of communication terminals in response to reception of the data request signal.

In addition, a communication system according to the disclosure includes a plurality of communication terminals each having a memory storing program data in charge of information communication, and a host device that communicates with the plurality of communication terminals. Each of the communication terminals transmits a start request signal to the host device in a case in which a distribution preparation completion signal indicating that preparation for distribution of update program data is completed is received from the host device, and transmits a data request signal to the host device in a case in which a permission signal for giving a right for performing a data request is received from the host device, and the host device transmits the distribution preparation completion signal by anycast to only each of the communication terminals belonging to one desired group when the plurality of communication terminals are divided into n (where n is an integer equal to or greater than two) groups, then transmits the permission signal to one communication terminal that has transmitted the start request signal earliest, and transmits the update program data by anycast to only each of the communication terminals belonging to the one group in response to reception of the data request signal.

A program update method according to the disclosure is a program update method of a communication system comprising a plurality of communication terminals each having a memory storing program data in charge of information communication, and a host device that communicates with the plurality of communication terminals. The program update method includes transmitting, by the host device, a distribution preparation completion signal indicating that preparation for distribution of update program data is completed by broadcast; transmitting, by each of the plurality of communication terminals, a start request signal to the host device in response to reception of the distribution preparation completion signal; transmitting, by the host device, a permission signal for giving a right for performing a data request to one communication terminal that has transmitted the start request signal earliest among the plurality of communication terminals; transmitting, by the one communication terminal, a data request signal to the host device in response to reception of the permission signal; and transmitting, by the host device, the update program data by broadcast to the plurality of communication terminals in response to reception of the data request signal.

DESCRIPTION OF THE EMBODIMENTS

The disclosure provides a communication system and a program update method capable of quickly performing an update of a program on a plurality of communication terminals regardless of the number of communication terminals.

In a communication system according to the disclosure, when updating a program stored in each of a plurality of communication terminals, the host device first transmits a distribution preparation completion signal by broadcast. Each of the plurality of communication terminals transmits a start request signal to the host device in response to reception of the distribution preparation completion signal. The host device transmits a permission signal for giving a right for performing a data request to one communication terminal that has transmitted the start request signal earliest. The one communication terminal transmits a data request signal to the host device in response to reception of the permission signal. The host device transmits the update program data by broadcast to the plurality of communication terminals in response to reception of the data request signal.

Therefore, according to the disclosure, it is possible to complete a program update in a short period in comparison with a case in which a host device performs distribution of update program data by one-to-one communication with each of a plurality of communication terminals.

Hereinafter, an embodiment of the disclosure will be described in detail with reference to the drawings.

Figure 1:
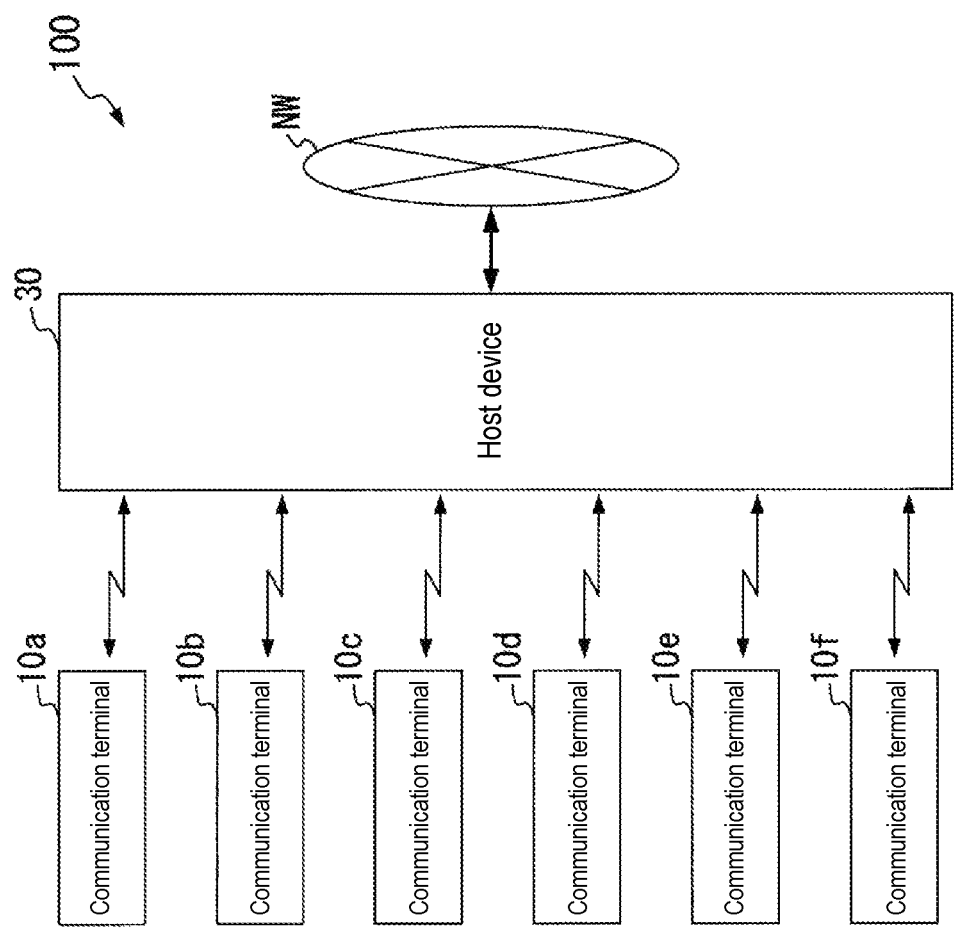
FIG. 1 is a block diagram showing a configuration of a communication system 100 according to the disclosure.

FIG. 1 is a block diagram showing a configuration of a communication system 100 according to the disclosure. The communication system 100 shown in FIG. 1 includes communication terminals 10a to 10f having the same configuration, and a host device 30 that communicates with the communication terminals 10a to 10f.

Each of the communication terminals 10a to 10f is installed, for example, on various manufacturing devices provided in a factory, or a wall, a floor, or a ceiling of a building. In addition, each of the communication terminals 10a to 10f may be carried by, for example, a person or an animal, or mounted on a moving object such as a vehicle, a ship, or an aircraft. The communication terminals 10a to 10f have the same internal configuration and operate in accordance with programs included in each of the communication terminals 10a to 10f. In addition, the communication terminals 10a to 10f have a function of updating a program stored therein by update program data wirelessly transmitted from the host device 30.

Figure 2:
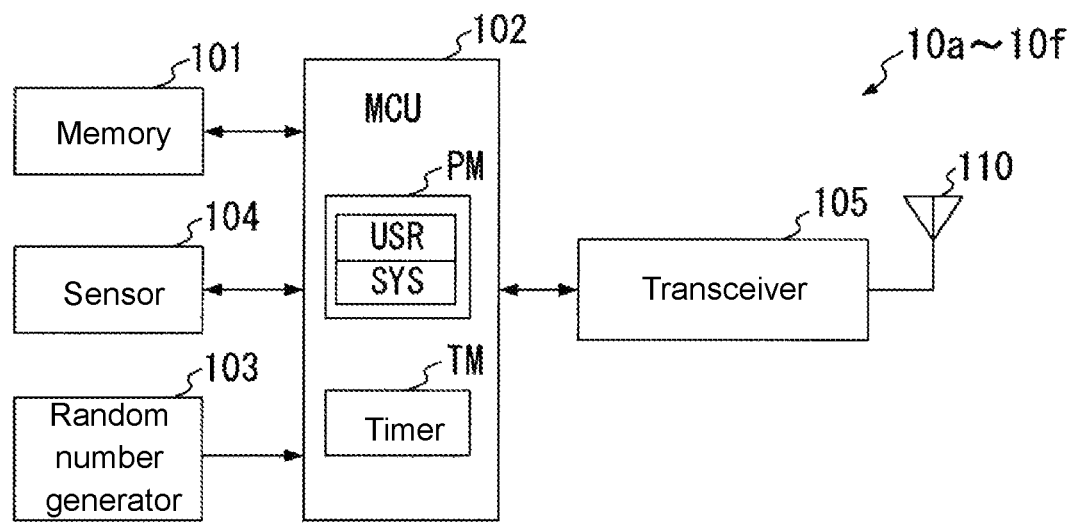
FIG. 2 is a block diagram showing an internal configuration of each of the communication terminals 10a to 10f.

FIG. 2 is a block diagram showing an example of an internal configuration of each of the communication terminals 10a to 10f.

Each of the communication terminals 10a to 10f includes a memory 101, a microcontroller 102 (hereinafter referred to as an MCU 102), a sensor 104, a transceiver 105, and an antenna 110.

For example, the memory 101 is a non-volatile memory such as a NAND flash memory.

Figure 3:
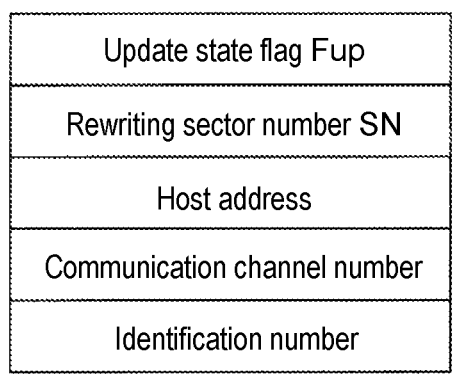
FIG. 3 is a diagram showing a part of a memory map of a memory 101.

FIG. 3 is a diagram showing an example of a memory map of the memory 101. The memory 101 stores, in advance, its own identification number, a communication channel number, and a host address indicating an address of the host device 30. In addition, an update state flag Fup indicating whether or not a program is being updated, and a rewriting sector number SN indicating a sector number during which the program is rewritten is recorded in the memory 101 as information necessary for program update by the MCU 102. The various types of information stored in the memory 101 are read by the MCU 102 as occasion demands.

A random number generator 103 generates a random number and supplies the random number to the MCU 102.

For example, the sensor 104 detects a natural phenomenon such as vibration, temperature, humidity, atmospheric pressure, illuminance, ultraviolet light, sound pressure or earth magnetism, or a mechanical, electromagnetic, thermal, acoustic or chemical characteristic of an artifact with a physical quantity, and provides detection information representing the detected physical quantity to the MCU 102.

The MCU 102 includes a program memory PM and a timer TM therein.

The timer TM counts a waiting time of a process at the time of program execution, a timeout time, and the like. In addition, the timer TM sets a time based on the random number generated by the random number generator 103 as a random time, and counts the random time.

The program memory PM has a user area USR that is an area in which data is rewritable, and a system area SYS that is an area in which the data rewriting is not permitted. In the user area USR, program data representing a main program in charge of a main function of the communication terminal 10 is stored. In the system area SYS, an update program for updating the main program, a program in charge of wireless communication, an initial program loader (IPL), and the like are stored.

The MCU 102 executes the above-described IPL according to an input of power supply to perform initialization of the MCU 102, and subsequently executes control according to the main program stored in the user area USR.

In addition, in a case in which the MCU 102 receives the distribution preparation completion signal from the transceiver 105, the MCU 102 reads the update program stored in the system area SYS of the program memory PM, and transitions to an update state of the program data by executing the update program (program update process).

According to the program update process, the MCU 102 controls the transceiver 105 to receive or transmit various communication signals representing a response, approval, request, or the like at the time of communication. At this time, in a case in which the update program data received by the transceiver 105 is received, the MCU 102 rewrites the main program stored in the user area USR of the program memory PM with the update program data.

Under the control of the MCU 102, the transceiver 105 wirelessly transmits a modulation signal obtained by modulating, for example, a carrier wave signal for a 920 MHz band telemeter with terminal data including the detection information described above to the host device 30 through the antenna 110.

In addition, under the control of the MCU 102, the transceiver 105 receives, through the antenna 110, a high frequency signal corresponding to a radio wave for the 920 MHz band telemeter wirelessly transmitted from the host device 30. In addition, the transceiver 105 performs a demodulation process on the high frequency signal to acquire various communication signals transmitted from the host device 30 and the update program data.

According to the configuration described above, each of the communication terminals 10a to 10f wirelessly transmits, to the host device 30, the terminal data including the detection information detected by the sensor 104 mounted on each of the communication terminals. In addition, in a case in which each of the communication terminals 10a to 10f receives the update program data wirelessly transmitted from the host device 30, each of the communication terminals 10a to 10f rewrites the main program stored in its own program memory PM with the update program data.

The host device 30 extracts the detection information from the terminal data wirelessly transmitted from each of the communication terminals 10a to 10f, and transmits a detection information group obtained by collecting the detection information corresponding to each of the communication terminals 10a to 10f, for example, to a communication network NW such as the Internet.

Furthermore, in response to a program update request from an administrator of the communication system 100, the host device 30 executes a program distribution process. Therefore, the host device 30 wirelessly transmits, for example, a modulation signal obtained by modulating the carrier wave signal for the 920 MHz band telemeter with various communication signals representing a response, approval, request, or the like at the time of communication, or the update program data.

Hereinafter, the program distribution process carried out by the host device 30 and the program update process performed by each of the communication terminals 10a to 10f will be described in detail.

[Program Distribution Process of Host Device 30]

Figure 4:
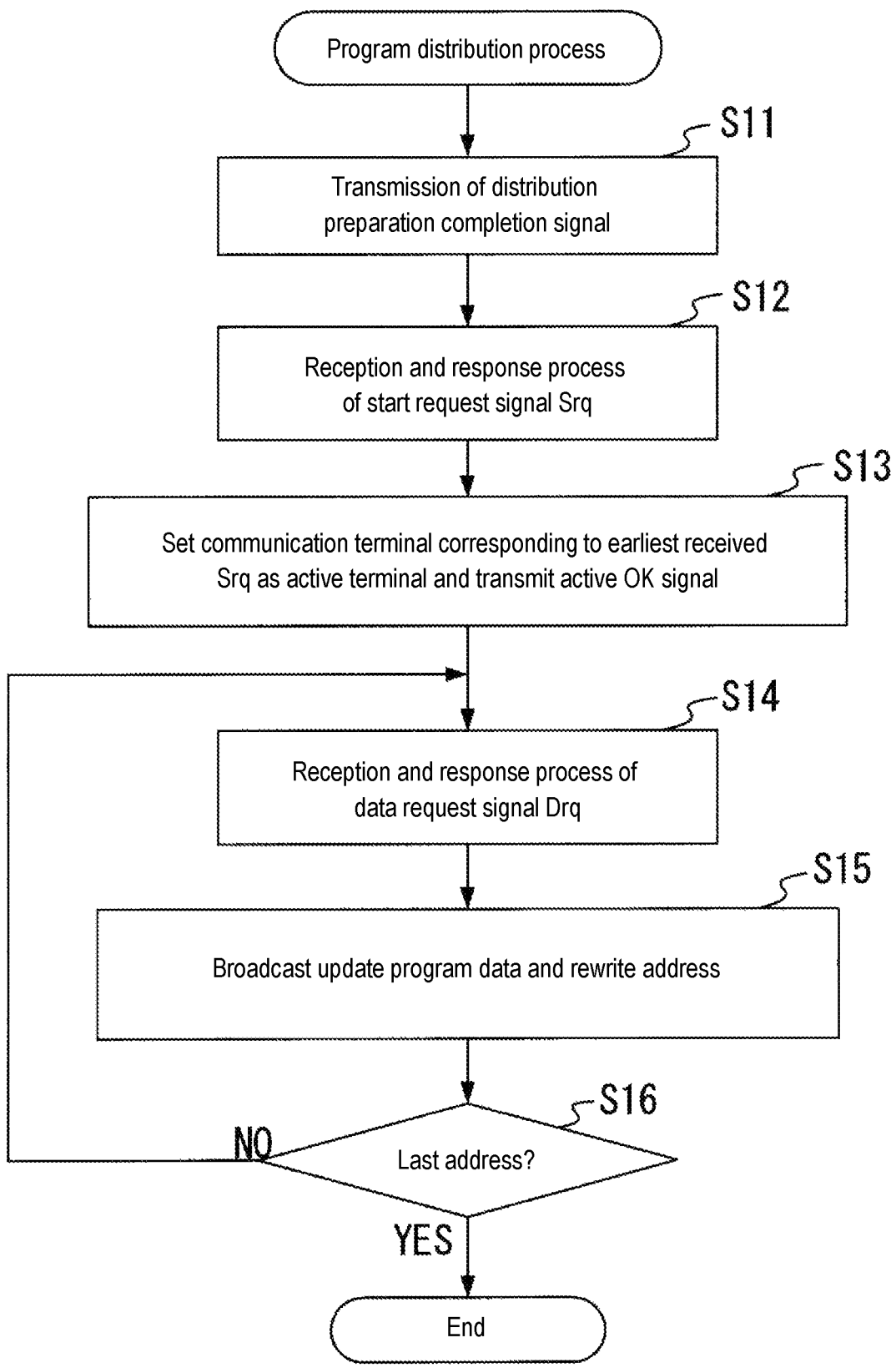
FIG. 4 is a flowchart showing a procedure of a program distribution process executed by a host device 30.

FIG. 4 is a flowchart showing a procedure of the program distribution process executed by the host device 30.

In FIG. 4, first, the host device 30 wirelessly transmits the distribution preparation completion signal indicating that preparation for distribution of the program is completed by broadcast to the communication terminals 10a to 10f (step S11).

Next, the host device 30 waits for reception of a start request signal Srq, and in a case in which the host device 30 receives the start request signal Srq, the host device 30 wirelessly transmits an acknowledge signal (hereinafter referred to as ACK) representing approval to the communication terminal of a transmission source of the start request signal Srq (step S12).

Next, the host device 30 wirelessly transmits an active OK signal to the communication terminal 10 of the transmission source of the start request signal Srq first received in step S12 (step S13). In addition, the active OK signal is a permission signal for giving a right for performing a data request to the host device 30. Here, in a case in which the host device 30 receives the ACK wirelessly transmitted from the communication terminal of the transmission source of the start request signal Srq, the host device 30 sets the communication terminal of the transmission source of the ACK as an active terminal, and proceeds to execution of the following step S14.

The host device 30 waits for reception of a data request signal Drq, and in a case in which the host device 30 receives the data request signal Drq, the host device 30 wirelessly transmits the ACK to the communication terminal of a transmission source of the data request signal Drq (step S14). In addition, during this time, in a case in which the host device 30 is not able to receive the data request signal Drq before a predetermined timeout time has elapsed, the host device 30 cancels the setting of the active terminal and subsequently returns to the execution of step S12 to set the active terminal again.

After the execution of step S14, the host device 30 wirelessly transmits the update program data of one packet corresponding to rewrite address information accompanying the received data request signal Drq together with the rewrite address information by broadcast (step S15). In addition, the rewrite address information is information indicating an address of a writing destination of the update program data in the user area USR of the program memory PM of each communication terminal.

After the execution of step S15, the host device 30 determines whether or not the address indicated by the rewrite address information is a last address of the user area USR in which a last one packet in the update program data is written (step S16). In a case in which it is determined in step S16 that the address is not the last address, the host device 30 returns to the execution of step S14 described above.

Therefore, the host device 30 transmits the update program data of one packet at a time in sequence by broadcast by repeatedly executing the series of processes including steps S14 to S16 described above.

In addition, in a case in which it is determined in step S16 that the address is the last address, the host device 30 ends the program distribution process.

[Program update process of each of communication terminals 10a to 10f]

In a case in which the MCU 102 of each of the communication terminals 10a to 10f receives the distribution preparation completion signal wirelessly transmitted by broadcast by the host device 30, the MCU 102 reads the update process program stored in the system area of the program memory PM. In addition, the MCU 102 executes the program update process according to the update process program.

Figure 5:
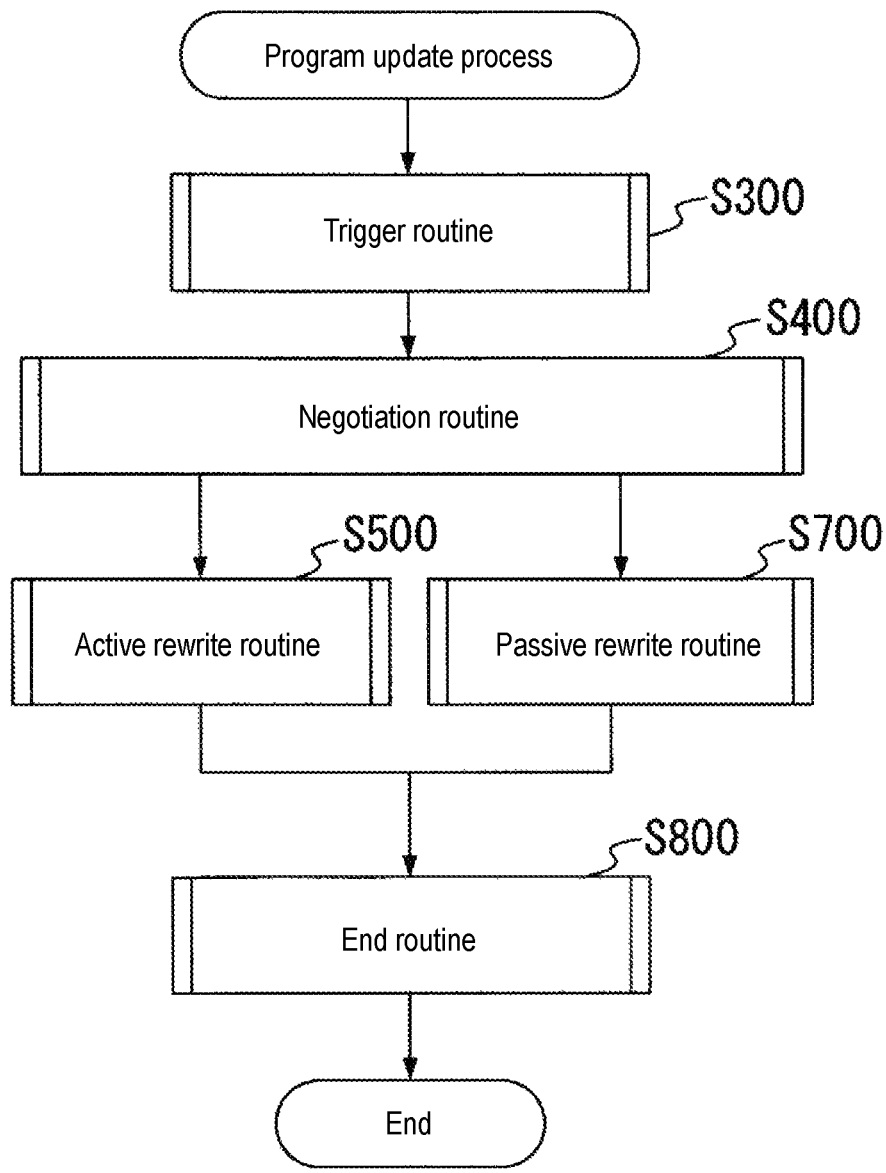
FIG. 5 is a flowchart showing a procedure of a program update process executed by an MCU 102 of each of the communication terminals 10a to 10f.

FIG. 5 is a flowchart showing a procedure of the program update process. As shown in FIG. 5, the MCU 102 sequentially executes a trigger routine S300, a negotiation routine S400, an active rewrite routine S500 (or a passive rewrite routine S700), and an end routine S800.

Figure 6:
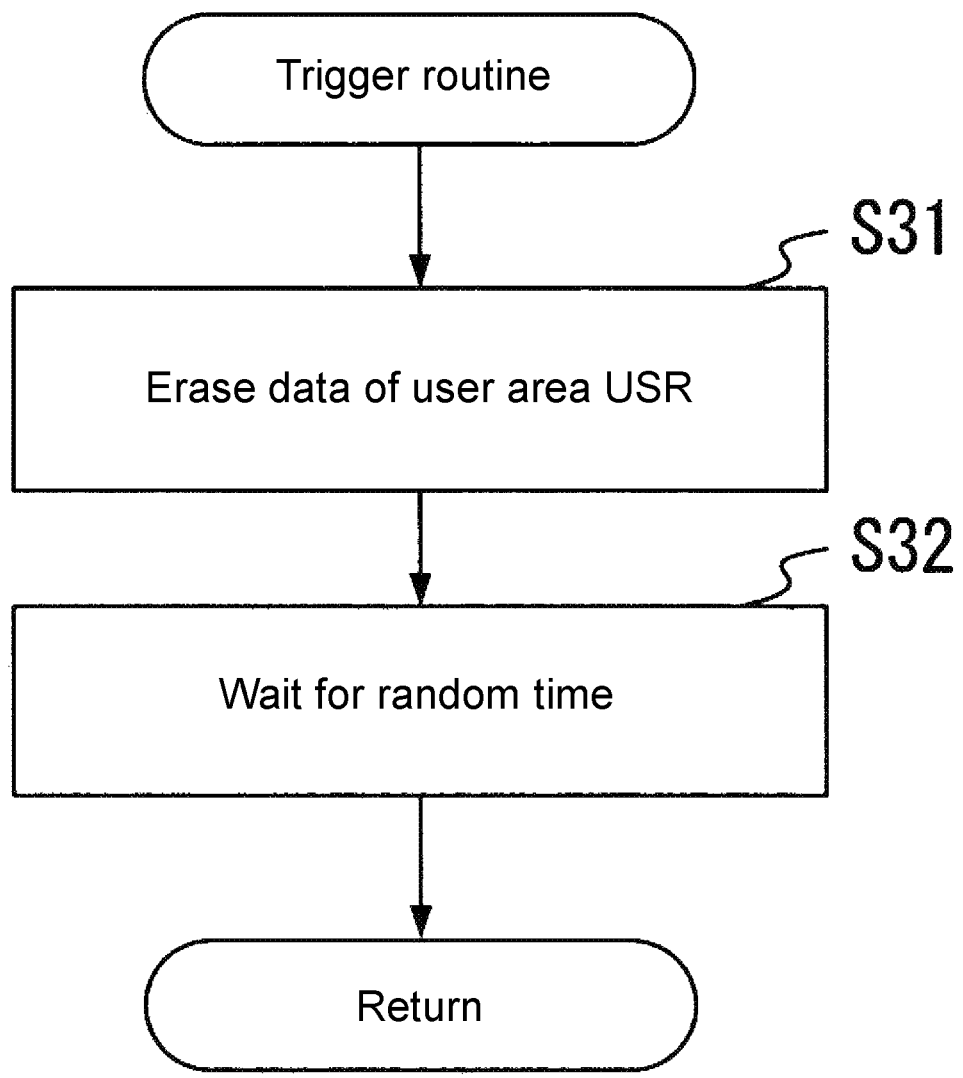
FIG. 6 is a flowchart showing a trigger routine.

FIG. 6 is a flowchart showing the trigger routine S300.

In FIG. 6, first, the MCU 102 erases the program data stored in the user area USR of the program memory PM (step S31). Next, the MCU 102 waits for the random time based on the random number generated by the random number generator 103 by the timer TM (step S32), and then proceeds to execution of the next negotiation routine S400.

Figure 7:
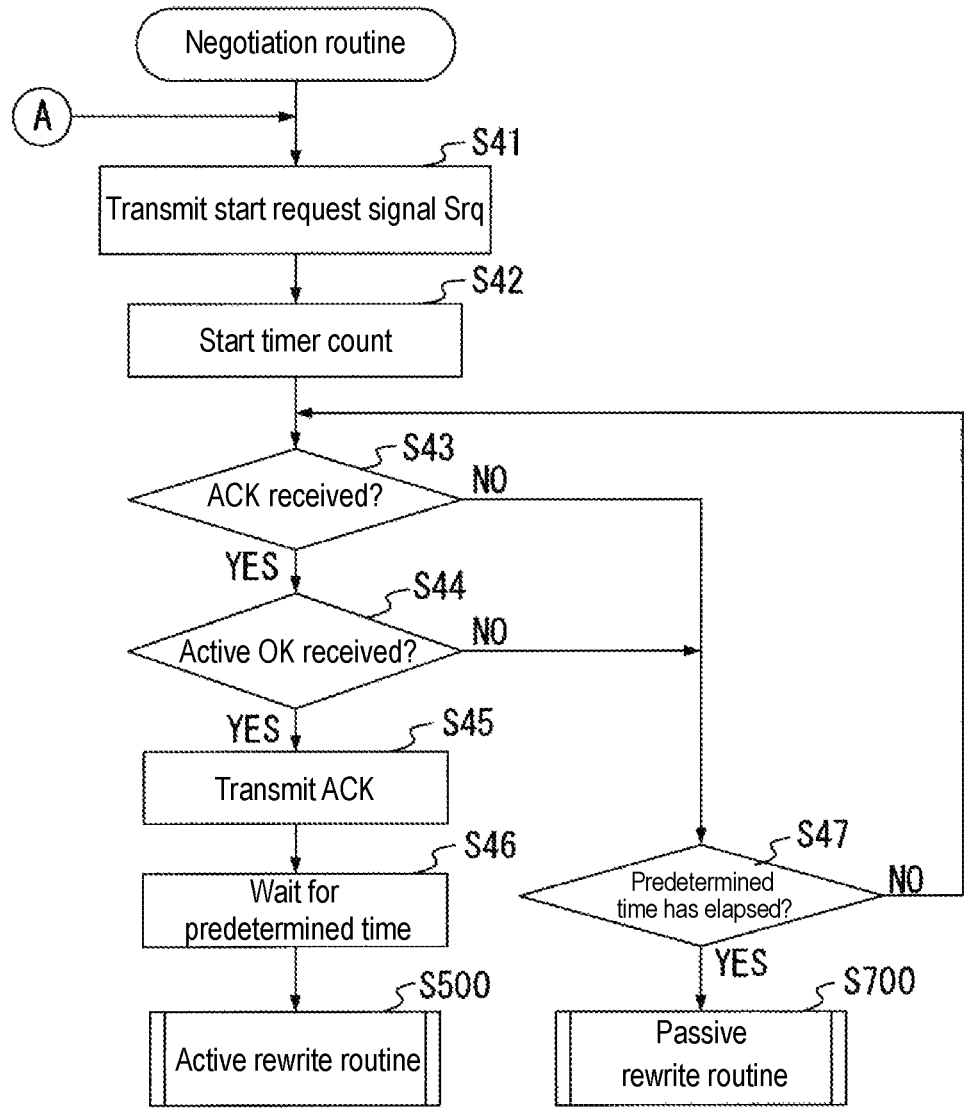
FIG. 7 is a flowchart showing a negotiation routine.

FIG. 7 is a flowchart showing the negotiation routine S400.

In FIG. 7, first, the MCU 102 causes the transceiver 105 to wirelessly transmit the start request signal Srq to the host device 30 by controlling the transceiver 105 (step S41). Here, as described above, the wireless communication between each communication terminal 10 and the host device 30 is actually performed by the MCU 102 controlling the transceiver 105. However, in the following, in order to simplify the description, an operation of the transceiver 105 is omitted, and the description is given in such a form that the MCU 102 directly performs the wireless communication (transmission and reception) with the host device 30.

By the executing step S32 of the trigger routine shown in FIG. 6 and step S41, after receiving the distribution preparation completion signal, the MCU 102 waits for the random time based on the random number and then wirelessly transmits the start request signal Srq to the host device 30.

Next, the MCU 102 starts counting of the timer TM from a predetermined initial value (step S42). After the execution of step S42, the MCU 102 determines whether or not the ACK has been received (step S43). In a case in which it is determined in step S43 that the ACK has been received, the MCU 102 next determines whether or not the active OK signal has been received as the permission signal for giving the right for performing the data request (step S44). In a case in which it is determined in step S44 that the active OK signal has been received, the MCU 102 wirelessly transmits the ACK to the host device 30 (step S45). Next, the MCU 102 waits for a predetermined time by the timer TM (step S46), and then proceeds to execution of the active rewrite routine S500.

On the other hand, in a case in which it is determined in step S43 that the ACK has not been received, or in a case in which it is determined in step S44 that the active OK signal has not been received, the MCU 102 determines whether or not the time counted by the timer TM exceeds the predetermined time (step S47). In a case in which it is determined in step S47 that the time does not exceed the predetermined time, the MCU 102 returns to the execution of step S43 described above.

In a case in which it is determined in step S47 that the time exceeds the predetermined time, the MCU 102 proceeds to execution of the passive rewrite routine S700. That is, the MCU 102 of the communication terminal 10 that has transmitted the start request signal Srq but failed to receive the active OK signal from the host device 30 or failed to transmit the start request signal Srq proceeds to the execution of the passive rewrite routine S700.

Figure 8:
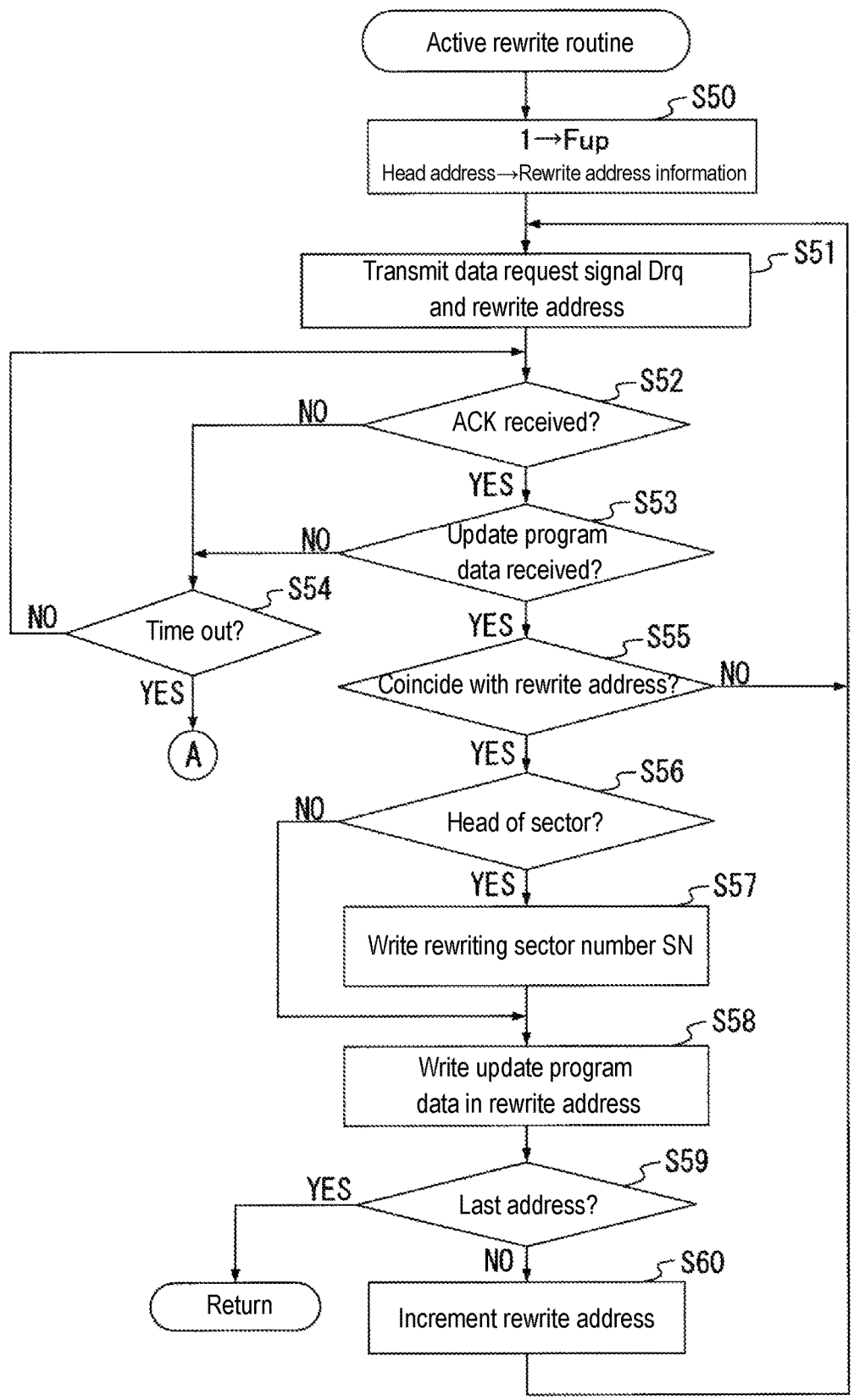
FIG. 8 is a flowchart showing an active rewrite routine.

FIG. 8 is a flowchart showing the active rewrite routine S500.

In FIG. 8, the MCU 102 writes a logic level 1 indicating that the program is being updated as the update state flag Fup stored in the memory 101 (step S50). Furthermore, in the step S50, the MCU 102 generates rewrite address information indicating a head address in the user area USR in which the update program data is to be written.

Next, the MCU 102 wirelessly transmits the rewrite address information and the data request signal Drq to the host device 30 (step S51). Next, the MCU 102 determines whether or not the ACK has been received (step S52). In a case in which it is determined in step S52 that the ACK has been received, the MCU 102 determines whether or not the update program data has been received (step S53).

In a case in which it is determined in step S52 described above that the ACK has not been received, or in a case in which it is determined in step S53 that the update program data has not been received, the MCU 102 determines whether or not the time counted by timer TM exceeds the predetermined timeout time (step S54). That is, in step S54, the MCU 102 determines whether or not the timeout time has elapsed since the start request signal Srq is transmitted in step S41 described above.

In a case in which it is determined in step S54 that the timeout time has elapsed, the MCU 102 returns to the execution of step S41 of the negotiation routine shown in FIG. 7. That is, the MCU 102 performs the retransmission for transmitting the start request signal Srq to the host device 30 again.

On the other hand, in a case in which it is determined in step S54 that the timeout time has not elapsed, the MCU 102 returns to the execution of step S52 described above.

Here, in a case in which it is determined in step S53 that the update program data has been received, the MCU 102 determines whether or not the rewrite address information accompanying the update program data coincides with the rewrite address information wirelessly transmitted together with the data request signal Drq in step S51 (step S55). In a case in which it is determined in step S55 that the rewrite address information does not coincide, the MCU 102 returns to the execution of step S51. In a case in which it is determined in step S55 that the rewrite address information coincides, the MCU 102 determines whether or not the rewrite address information indicates the head address of the sector of the program memory PM (step S56).

In a case in which it is determined in step S56 that the rewrite address information indicates the head address of the sector, the MCU 102 overwrites a sector number indicating this sector in the memory 101 as the rewriting sector number SN shown in FIG. 3 (step S57).

After the execution of step S57, or in a case in which it is determined in step S56 that the rewrite address information does not indicate the head address of the sector, the MCU 102 writes the received update program data of one packet at a position indicated by the rewrite address information in the user area USR of the program memory PM (step S58). Next, the MCU 102 determines whether or not the rewrite address information indicates the last address described above (step S59). In a case in which it is determined in step S59 that the rewrite address information does not indicate the last address, the MCU 102 increments a value of the address indicated by the rewrite address information to a value representing a next write position in the user area USR (step S60). After the execution of step S60, the MCU 102 returns to the execution of step S51.

In addition, in a case in which it is determined in step S59 that the rewrite address information indicates the last address, the MCU 102 exits the active rewrite routine and proceeds to execution of the next end routine S800.

Figure 9:
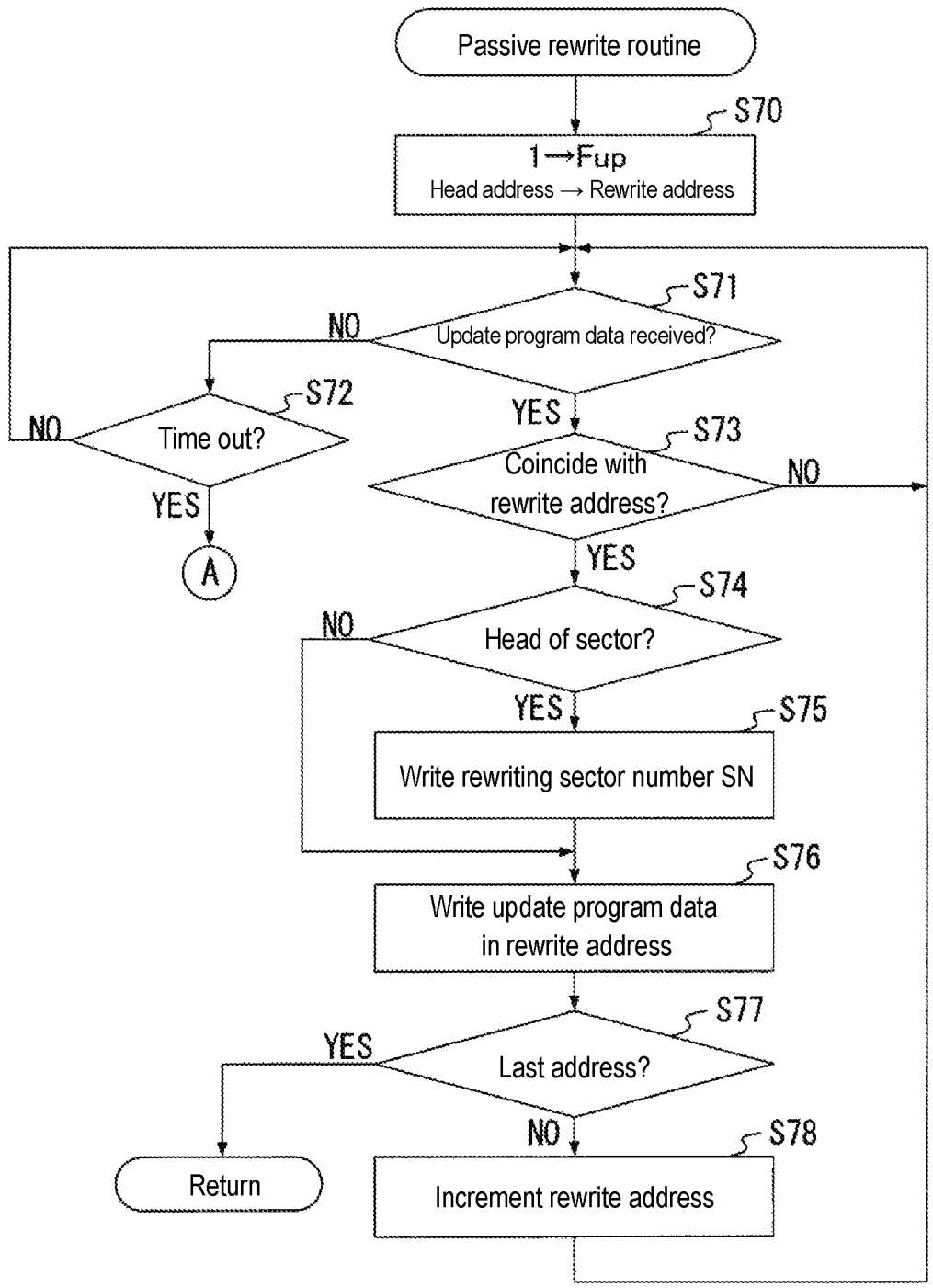
FIG. 9 is a flowchart showing a passive rewrite routine.

FIG. 9 is a flowchart showing the passive rewrite routine S700.

In FIG. 9, the MCU 102 writes the logic level 1 indicating that the program is being updated as the update state flag Fup stored in the memory 101 (step S70). Furthermore, in step S70, the MCU 102 generates the rewrite address information indicating the head address in the user area USR in which the update program data is to be written.

Next, the MCU 102 determines whether or not the update program data has been received (step S71).

In a case in which it is determined in step S71 that the update program data has not been received, the MCU 102 determines whether or not the time counted by the timer TM exceeds the predetermined timeout time (step S72). That is, in step S72, the MCU 102 determines whether or not the timeout time has elapsed since the start request signal Srq is transmitted in step S41 described above.

In a case in which it is determined in step S72 that the timeout time has elapsed, the MCU 102 returns to the execution of step S41 of the negotiation routine shown in FIG. 7. That is, the MCU 102 performs the retransmission for transmitting the start request signal Srq to the host device 30 again.

On the other hand, in a case in which it is determined in step S72 that the timeout time has not elapsed, the MCU 102 returns to the execution of step S71 described above.

In a case in which it is determined in step S71 that the update program data has been received, the MCU 102 determines whether or not the rewrite address information accompanying the update program data coincides with the rewrite address information generated by the MCU 102 (step S73).

In a case in which it is determined in step S73 that the rewrite address information does coincide, the MCU 102 determines whether or not the rewrite address information indicates the head address of the sector of the program memory PM (step S74).

In a case in which it is determined in step S74 that the rewrite address information indicates the head address of the sector, the MCU 102 writes a sector number indicating this sector in the memory 101 as the rewriting sector number SN shown in FIG. 3 (step S75).

After the execution of step S75, or in a case in which it is determined in step S74 that the rewrite address information does not indicate the head address of the sector, the MCU 102 writes the received update program data of one packet at the position indicated by the rewrite address information in the user area USR of the program memory PM (step S76).

Next, the MCU 102 determines whether or not the rewrite address information indicates the last address (step S77). In a case in which it is determined in step S77 that the rewrite address information does not indicate the last address, the MCU 102 increments a value of the address indicated by the rewrite address information to a value representing a next write position in the user area USR (step S78). After the execution of step S78, the MCU 102 returns to the execution of step S71.

In addition, in a case in which it is determined in step S77 that the rewrite address information indicates the last address, since the program update by the update program data is completed, the MCU 102 exits the passive rewrite routine and proceeds to the execution of the next end routine S800.

Figure 10:
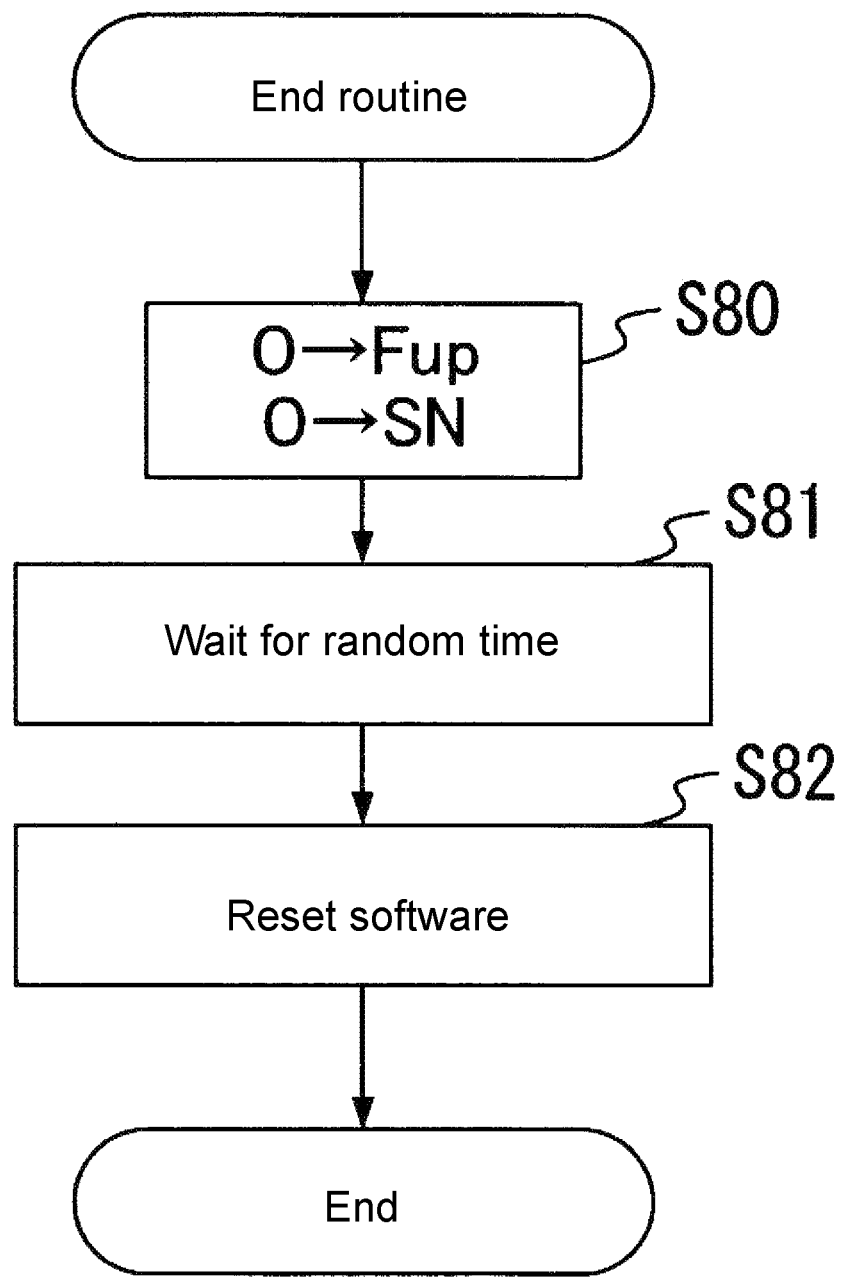
FIG. 10 is a flowchart showing an end routine.

FIG. 10 is a flowchart showing the end routine S800.

In FIG. 10, the MCU 102 rewrites the update state flag Fup stored in the memory 101 to a logic level 0 indicating that the program is not being updated, and rewrites the rewriting sector number SN to 0 as an initial value (step S80). After the execution of step S80, the MCU 102 waits for a random time based on the random number generated by the random number generator 103 by the timer TM (step S81), and then performs software reset (step S82).

Hereinafter, a communication operation performed by the program distribution process of the host device 30 and the program update process of each of the communication terminals 10*a* to 10*f* described above will be described according to a communication flow shown in FIG. 11.

Figure 11:
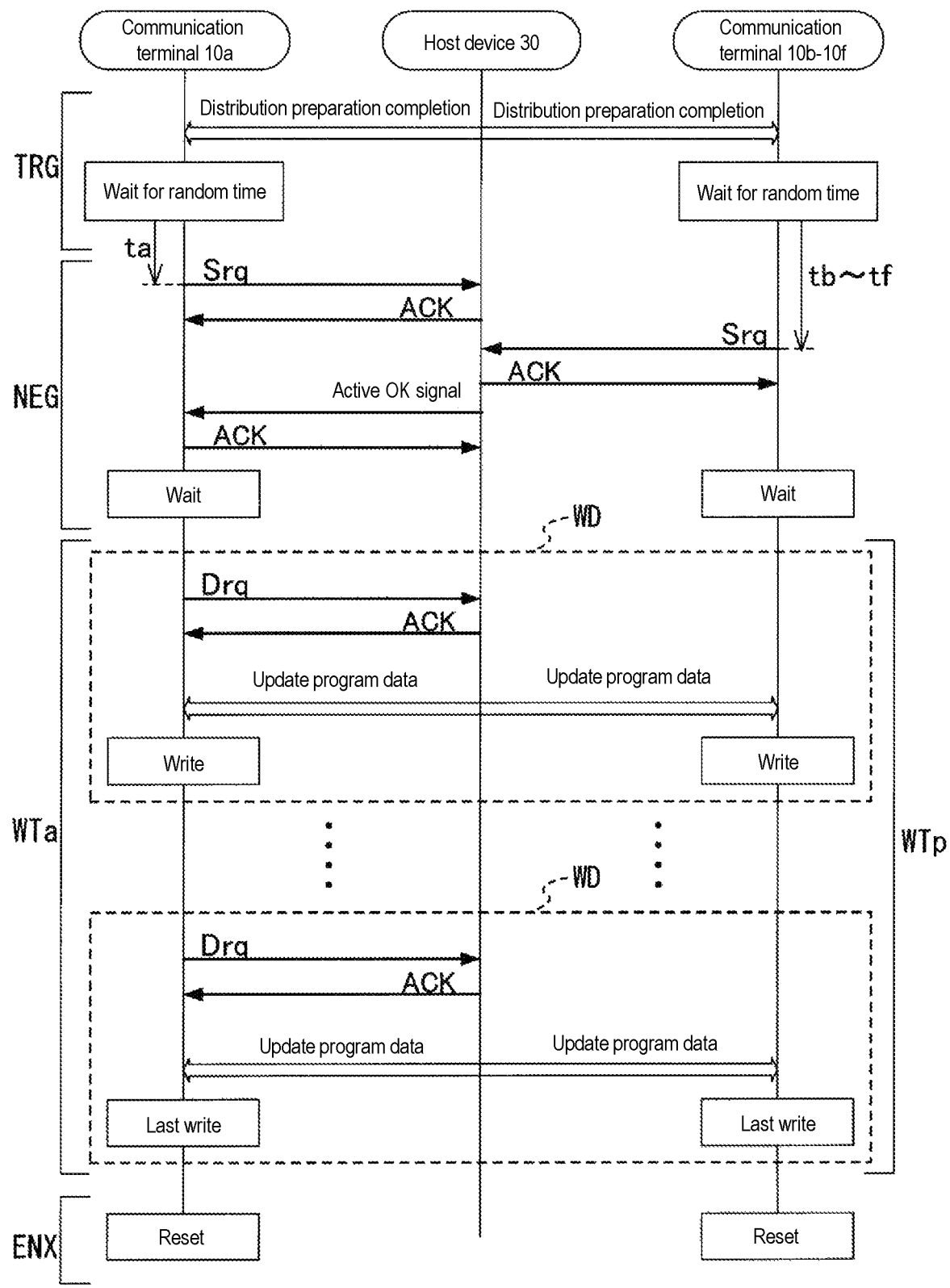
FIG. 11 is a communication flow diagram showing a procedure of communication performed between the host device 30 and the communication terminals 10a to 10f at the time of program update.

As shown in FIG. 11, the update of the program is sequentially performed through a trigger step TRG, a negotiation step NEG, an active rewrite step WTa or a passive rewrite step WTp, and an end step ENX shown below.

In addition, in FIG. 11, the communication terminal 10*a* among the communication terminals 10*a* to 10*f*, the other communication terminals 10*b* to 10*f*, and the host device 30 are shown separately, and an example of the communication operation between each communication terminal and the host device is shown.

[Trigger Step TRG]

First, the host device 30 wirelessly transmits the distribution preparation completion signal indicating that preparation for distribution of the update program data is completed by broadcast. In a case in which the communication terminals 10*a* to 10*f* receive the distribution preparation completion signal, the communication terminals 10*a* to 10*f* individually execute the trigger routine shown in FIG. 6. Therefore, each of the communication terminals 10*a* to 10*f* erases all data stored in the user area USR of its own program memory PM, that is, the program data (S31). In a case in which the data erasure is ended, the communication terminals 10*a* to 10*f* wait for a random time based on the random numbers generated by the respective random number generators 103 (S32), and then proceed to a process of the next negotiation step NEG.

In addition, in an example shown in FIG. 11, a random time ta of the communication terminal 10*a* is shorter than the random times tb to tf of the communication terminals 10*b* to 10*f*.

[Negotiation Step NEG]

The communication terminals 10*a* to 10*f* individually wirelessly transmit the start request signal Srq to the host device 30 at a time point when each of the random times ta to tf has elapsed after the erasure of the data stored in their own user area USR is completed (S41). In a case in which the host device 30 receives the start request signal Srq, the host device 30 wirelessly transmits the ACK to the communication terminal 10 of the transmission source of the start request signal Srq (S12). Here, after the end of the transmission of the distribution preparation completion signal (S11), or after the cancellation of the setting as the active terminal, the host device 30 sets the communication terminal 10 which first transmitted the start request signal Srq as the active terminal (S13). In addition, the host device 30 wirelessly transmits the active OK signal that is the permission signal for giving the right for performing the data request to the communication terminal 10 (S13). At this time, the communication terminal 10 having received the active OK signal wirelessly transmits the ACK to the host device 30 (S45).

In addition, in the example shown in FIG. 11, as described above, among the communication terminals 10*a* to 10*f*, the communication terminal 10*a* transmits the start request signal Srq earliest. Therefore, at this time, as shown in FIG. 11, the host device 30 wirelessly transmits the active OK signal to only the communication terminal 10*a* among the communication terminals 10*a* to 10*f*.

Here, the communication terminal having received the active OK signal, that is, the communication terminal 10*a* set as the active terminal, waits for a predetermined time (S46), and then proceeds to a process of the active rewrite step WTa. On the other hand, the communication terminals determined as having not received the active OK signal in a predetermined time (S44, S47), and the communication terminals failing to transmit the start request signal Srq, that is, the communication terminals 10*b* to 10*f*, proceed to a process of the passive rewrite step WTp.

[Active Rewrite Step WTa]

The communication terminal 10*a* having received the active OK signal first wirelessly transmits the data request signal Drq including the rewrite address information indicating an address for writing the update program data of one packet in the user area USR to the host device 30 (S51). In a case in which the host device 30 receives the data request signal Drq, first, the host device 30 wirelessly transmits the ACK indicating approval to the communication terminal 10*a* of the transmission source of the data request signal Drq (S14). In addition, the host device 30 wirelessly transmits the update program data of one packet (including the rewrite address information) corresponding to the address indicated by the rewrite address information described above by broadcast to the communication terminals 10*a* to 10*f* (S15).

The communication terminal 10*a* having received the update program data (including the rewrite address information) writes the rewriting sector number SN representing the sector number in the memory 101 in order to record that data is being rewritten at the head of the sector in the user area USR (S57). In addition, the communication terminal 10*a* writes the received update program data of one packet in the address indicated by the rewrite address information in the user area USR (S58).

[Passive rewrite step WTp]

On the other hand, the communication terminals 10*b* to 10*f* which have not received the active OK signal wait for reception of the update program data (S71, S72) after the negotiation step NEG is ended. Here, similar to the communication terminal 10*a*, each of the communication terminals 10*b* to 10*f* having received the update program data (including the rewrite address information) writes the rewriting sector number SN representing the sector number in the memory 101 in order to record that data is being rewritten at the head of the sector in the user area USR (S75). In addition, each of the communication terminals 10*b* to 10*f* writes the received update program data of one packet in the address indicated by the rewrite address information in its own user area USR (S76). In the passive rewrite step WTp and the active rewrite step WTa, the series of processes described above, that is, a write process WD surrounded by a broken line in FIG. 11, is repeatedly executed until the address indicated by the rewrite address information reaches the last address. Therefore, all pieces of the update program data are sequentially written in the user area USR of the program memory PM of each of the communication terminals 10*a* to 10*f* one packet at a time.

Here, in a case in which the writing of the update program data in the passive rewrite step WTp and the active rewrite step WTa described above is completed, the communication terminals 10*a* to 10*f* proceed to a process of the end step ENX.

[End Step ENX]

Each of the communication terminals 10*a* to 10*f* resets the update state flag Fup to the logic level 0 indicating that the program is not being updated, resets the rewriting sector number SN to 0 as an initial value (S80), and performs the software reset (S82) simultaneously.

As described above, in the communication system 100, the host device 30 wirelessly transmits the update program data by broadcast to all of the communication terminals 10*a* to 10*f*. Therefore, it is possible to complete the program update in a short period in comparison with a case in which the host device 30 sequentially distributes the update program data to the communication terminals 10*a* to 10*f* by one-to-one communication.

In addition, in the embodiment described above, six communication terminals 10*a* to 10*f* are included in the communication system 100, but at least two or more communication terminals may be included. In addition, in the embodiment described above, the communication between the host devices 30 and each of the communication terminals 10*a* to 10*f* is performed wirelessly, but may be performed by wired communication.

In short, it is sufficient that the communication system 100 includes the plurality of communication terminals (10*a* to 10*f*) each having the memory (PM) in which the program data in charge of information communication is stored, and the host device (30). In a case in which each of the plurality of communication terminals receives the distribution preparation completion signal indicating that the preparation for distribution of the update program data is completed from the host device, each of the plurality of communication terminals transmits the start request signal (Srq) to the host device (30) (S41). Furthermore, in a case in which each of the plurality of communication terminals (10*a* to 10*f*) receives the permission signal (active OK signal) for giving the right for performing the data request from the host device (S44), each of the plurality of communication terminals (10*a* to 10*f*) transmits the data request signal (Drq) to the host device (S51).

The host device (30) transmits the distribution preparation completion signal described above by broadcast (S11). Thereafter, the above-described permission signal (active OK signal) is transmitted to one communication terminal that has transmitted the start request signal (Srq) earliest among the plurality of communication terminals (S13). Thereafter, in response to the reception of the data request signal (Drq) (S14), the host device transmits the update program data by broadcast (S15).

In addition, the communication system 100 copes with an unexpected reset, a power down due to a shortage of a battery or the like, or a communication error during the program update process.

[Countermeasure at the Time of Reset Occurrence or Power Down]

For example, in a case in which a reset occurs during the program update process, the MCU 102 of each of the communication terminals 10*a* to 10*f* executes a reset handling routine in the update process program stored in the system area SYS of the program memory PM after the reset process. In addition, also in a case in which the power is cut off during the program update process, the MCU 102 executes this reset handling routine in response to the subsequent power input.

Figure 12:
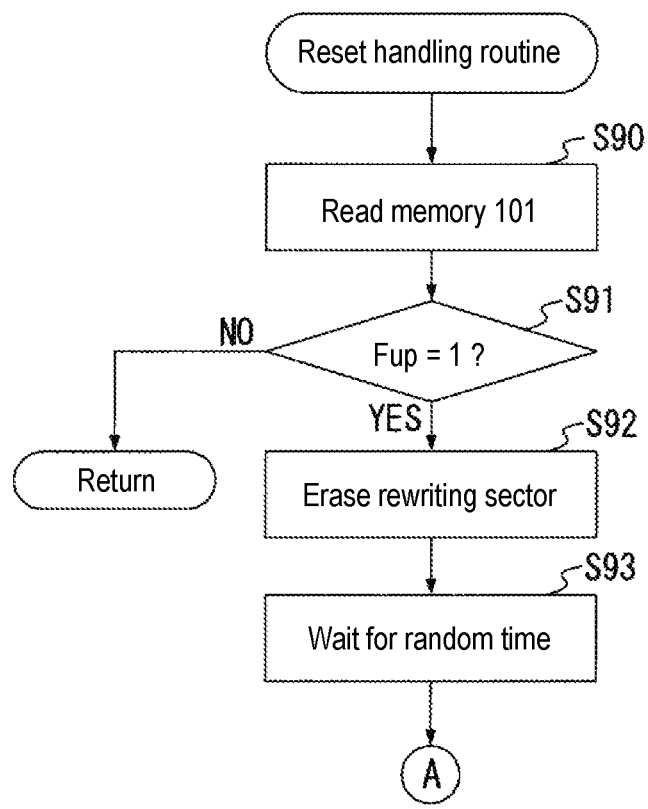
FIG. 12 is a flowchart showing a reset handling routine.

FIG. 12 is a flowchart showing the reset handling routine.

In FIG. 12, first, the MCU 102 reads contents written in the memory 101 as shown in FIG. 3 (step S90). Next, the MCU 102 determines whether or not the update state flag Fup shown in FIG. 3 is the logic level 1 indicating that the program is being updated (step S91). In a case in which it is determined in step S91 that the update state flag Fup is not the logic level 1, since the reset during the program update is not performed, the MCU 102 exits the reset handling routine and returns to the operation of the main program. On the other hand, in a case in which the update state flag Fup is the logic level 1, since the reset during the program update is performed, there is a concern that a part of the update program data not written in the sector in the middle of writing.

Therefore, in a case in which it is determined in step S91 that the update state flag Fup is the logic level 1, the MCU 102 erases the data in the sector in the user area USR indicated by the rewriting sector number SN shown in FIG. 3 (step S92). Next, the MCU 102 waits for a random time based on the random number generated by the random number generator 103 (step S93), and continues to proceed to the execution of the negotiation routine shown in FIG. 7.

By executing the above-described reset handling routine, each of the communication terminals 10a to 10f, after reset, rewrites the update program data to the sector to which the update program data has been written at the time of the reset occurrence.

Therefore, even though reset or power down occurs during the update of the program, it is possible to correctly perform the update of the program.

[Countermeasure Against at the Time of Communication Error]

In a case in which a communication error temporarily occurs, the communication terminals 10a to 10f are not able to receive the update program data during that time, but thereafter, in a case in which normal communication is resumed, each of the communication terminals 10a to 10f is able to receive the update program data. However, in a case in which a time required to normalize the communication is long, the host device 30 is required to repeatedly transmit the update program data during that time. Therefore, since a period during which invalid communication is carried out becomes long, a reduction of communication efficiency and an increase of power consumption are caused. In addition, in a case in which a total transmission time is defined, since the host device 30 spends a lot of time in transmitting the update program data, it is not possible to secure a time allocated to transmission in charge of other uses and a reduction of communication efficiency is caused.

Therefore, each of the communication terminals 10a to 10f sets a timeout time for waiting for reception of the update program data (S54, S72), and returns to the execution of the negotiation process shown in FIG. 7 at the timeout time. Therefore, the program update process is performed again from the negotiation step NEG shown in FIG. 11.

Hereinafter, the program update operation at the time of the occurrence of the communication error by the above-described process will be described.

Figure 13A:
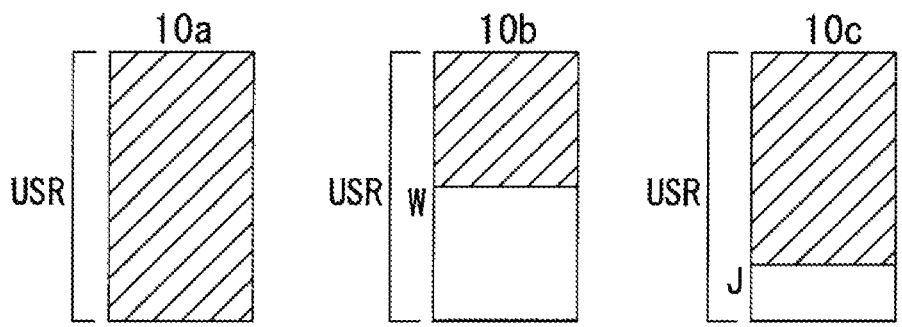
FIG. 13A is a diagram showing an example of an update form in a first step of update program data in a user area USR of each of the communication terminals 10a to 10c at the time of occurrence of a communication error.

FIG. 13A is a diagram showing an example of a write state (written: hatched, unwritten: blank) in the user area USR of each of the communication terminals 10a to 10c at the time of the occurrence of the communication error. In addition, in FIG. 13A, in the communication terminal 10a set as the active terminal, the writing of the update program data in its own user area USR is completed by the active rewrite (WTa). However, due to the communication error, in the communication terminal 10b, data is not written after the sector W in its own user area USR, and in the communication terminal 10c, data is not written after the sector J in its own user area USR.

Due to an influence of the communication error, the communication terminals 10b and 10c is time out (S72), and the negotiation step NEG is carried out again. Therefore, the communication terminals 10b and 10c wirelessly transmit the start request signal Srq to the host device 30 again (S41).

Figure 13B:
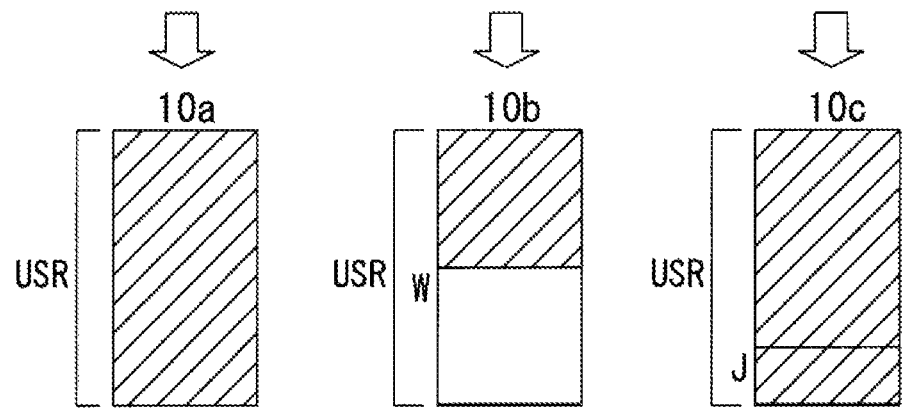
FIG. 13B is a diagram showing an example of the update form in a second step of the update program data in the user area USR of each of the communication terminals 10a to 10c at the time of the occurrence of the communication error.

Here, in a case in which the communication terminal 10c transmits the start request signal Srq to the host device 30 earlier than the communication terminal 10b, the communication terminal 10c is set as the active terminal. Therefore, the communication terminal 10c wirelessly transmits the data request signal Drq to the host device 30 together with the rewrite address information indicating the address for requesting the update program data after the head address of the sector J (S51). Thus, the host device 30 wirelessly transmits the update program data corresponding to the head address of the sector J by broadcast (S15). At this time, as shown in FIG. 13B, the communication terminal 10c writes the received update program data from the head address of the sector J of its own user area USR (S58).

Figure 13C:
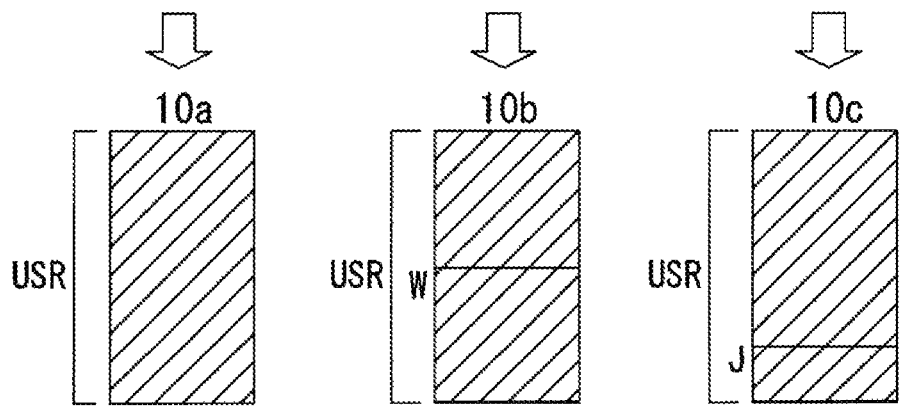
FIG. 13C is a diagram showing an example of the update form in a third step of the update program data in the user area USR of each of the communication terminals 10a to 10c at the time of the occurrence of the communication error.

On the other hand, since the received rewrite address information is different from the rewrite address (W) desired by the communication terminal 10b, the communication terminal 10b waits for reception (S73, S71). At that time, in the communication terminal 10c, as shown in FIG. 13B, in a case in which the writing of the update program data is completed, the broadcast transmission of the update program data is not performed. Therefore, in the communication terminal 10b, since the counted time of the timer TM is not cleared, the reception waiting is time out (S72), and the negotiation step NEG is performed again. Thus, the communication terminal 10b wirelessly transmits the start request signal Srq to the host device 30 (S41). Accordingly, the communication terminal 10c is set as a new active terminal, and the communication terminal 10c wirelessly transmits the data request signal Drq to the host device 30 together with the rewrite address information indicating the address for requesting the update program after the head address of the sector W (S51). In response to this, the host device 30 wirelessly transmits the update program corresponding to the head address of the sector W by broadcast (S15). Therefore, as shown in FIG. 13C, the communication terminal 10b writes the received update program from the head address of the sector W of its own user area USR (S58).

As described above, each communication terminal 10 sets a timeout time for waiting for reception of the update program, and in a case in which timeout occurs due to the communication error during the program update process, negotiation (NEG) for determining the active terminal is performed again. Therefore, it is possible to shorten the period during which the invalid communication is performed in comparison with a case in which the host device 30 repeatedly transmits the update program data while the communication error continues. Thus, the reduction of communication efficiency and the ineffective power consumption are suppressed. In addition, since it is possible to shorten the period during which the invalid communication is performed, even in a case in which the total transmission time is defined, the host device 30 is able to transmit other data that is other than the update program data.

Incidentally, in the communication system 100 shown in FIG. 1, the host device 30 transmits the update program by broadcast to all of the communication terminals 10a to 10f. However, the communication terminals 10a to 10f may be divided into a plurality of groups, and the update program data may be distributed by anycast to only a communication terminal group belonging to a specific group.

Figure 14:
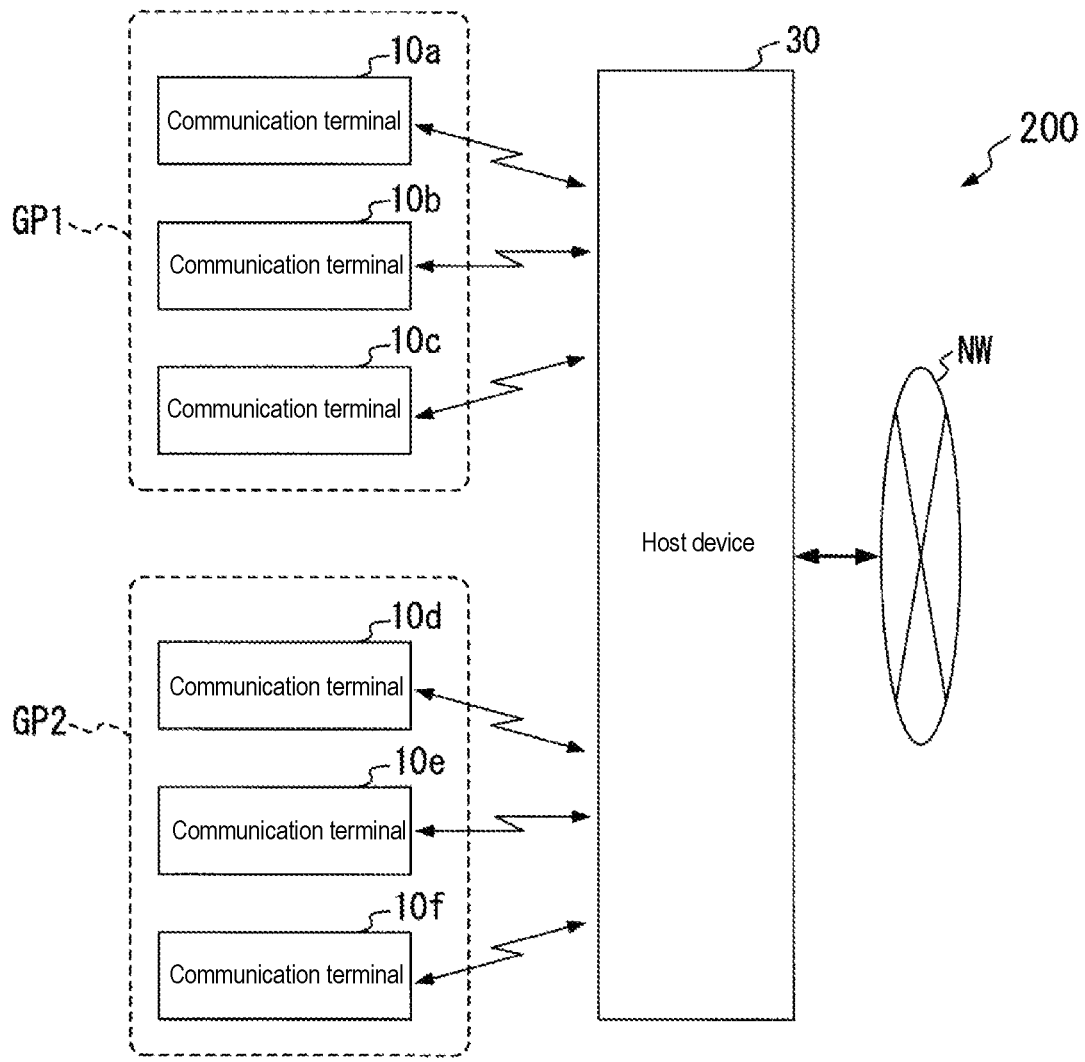
FIG. 14 is a block diagram showing a configuration of a communication system 200 that is another example according to the disclosure.

FIG. 14 is a block diagram showing a configuration of a communication system 200 configured in view of such a point. In the communication system 200, wireless communication conforming to, for example, the institute of electrical and electronics engineers (IEEE) 802.15.4 standard is performed between the host device 30 and the communication terminals 10a to 10f. In addition, in the communication system 200, the communication terminals 10a to 10f are divided into a first group GP1 configured of the communication terminals 10a to 10c and a second group GP2 configured of the communication terminals 10d to 10f, and different personal area network (PAN) IDs are allocated respectively.

In trigger step TRG shown in FIG. 11, the host device 30 wirelessly transmits the distribution preparation completion signal by anycast to only a group requiring the program update among the groups GP1 and GP2 using the PAN ID corresponding to the group. The subsequent process is the same as that shown by the communication flow shown in FIG. 11. Therefore, for example, in a case in which the host device 30 transmits the distribution preparation completion signal to only the group GP1, the host device 30 does not transmit the update program data to the communication terminal group belonging to the group GP2.

As described above, according to the communication system 200 shown in FIG. 14, among all of the communication terminals 10, it is possible to carry out the program update process on only the communication terminal 10 that belongs to the group having a request for the program update. For example, in a case in which a communication terminal on which a temperature sensor is mounted as the sensor 104 is grouped to the group GP1 and a communication terminal on which an acceleration sensor is mounted as the sensor 104 is grouped to the group GP2, the update program data is able to be distributed by anycast to only the group GP1. Therefore, since the update program data is not distributed to the communication terminal group belonging to the group GP2 which is not equipped with the program related to the temperature sensor, it is possible to omit invalid communication and power consumption.

In addition, as described above, in addition to grouping according to the function of the sensor 104 mounted on the communication terminal, grouping may be performed in place units where the communication terminals are installed. For example, by setting a communication terminal group installed in a factory A to the group GP1 and a communication terminal group installed in a factory B to the group GP2, it is possible to distribute the update program data to only the communication terminal group installed in the factory requiring the program update.

In addition, in the embodiment shown in FIG. 14, although six communication terminals 10a to 10f are included in the communication system 200, at least two or more communication terminals may be included. In addition, in the embodiment described above, the communication terminals 10a to 10f are divided into the two groups GP1 and GP2, but the number of the grouping may be three or more, and the number of the communication terminals belonging to each group may also be plural including two or more.

In short, the following configuration may be adopted as the plurality of communication terminals each having a memory (PM) storing the program data in charge of information communication and the host device included in the communication system 200. That is, in a case in which each of the plurality of communication terminals (10a to 10f) receives the distribution preparation completion signal indicating that the preparation for distribution of the update program data is completed from the host device (30), each of the plurality of communication terminals (10a to 10f) transmits the start request signal (Srq) to the host device (30) (S41). Furthermore, in a case in which each of the plurality of communication terminals receives the permission signal (active OK signal) for giving the right for performing the data request from the host device (S44), each of the plurality of communication terminals transmits the data request signal (Drq) to the host device (S51).

The host device (30) transmits the distribution preparation completion signal by anycast to only each of the communication terminals belonging to one desired group when the plurality of communication terminals are divided into n (n is an integer equal to or greater than two) groups. Thereafter, the host device transmits the above-described permission signal (active OK signal) to one communication terminal that has transmitted the start request signal (Srq) earliest among the plurality of communication terminals (S13). In addition, in response to the reception of the data request signal (Drq) (S14), the host device transmits the update program data by anycast to the communication terminals belonging to the one group described above.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication system comprising:
a plurality of communication terminals each having a memory storing program data in charge of information communication; and
a host device that communicates with the plurality of communication terminals,
wherein each of the communication terminals transmits a start request signal to the host device in a case in which a distribution preparation completion signal indicating that preparation for distribution of update program data is completed is received from the host device, and transmits a data request signal to the host device in a case in which a permission signal for giving a right for performing a data request is received from the host device, and
the host device transmits the distribution preparation completion signal by broadcast, and then transmits the permission signal to one communication terminal that has transmitted the start request signal earliest among the plurality of communication terminals, and transmits the update program data by broadcast to the plurality of communication terminals in response to reception of the data request signal.

2. The communication system according to claim 1, wherein each of the plurality of communication terminals waits for a random time based on a random number after receiving the distribution preparation completion signal, and then transmits the start request signal to the host device.

3. The communication system according to claim 1, wherein, in a case in which each of the plurality of communication terminals does not receive the update program data within a predetermined timeout time after transmitting the start request signal, each of the plurality of communication terminals performs retransmission for transmitting the start request signal to the host device again, and the host device transmits the permission signal to the communication terminal that has performed the retransmission of the start request signal earliest among the plurality of communication terminals and transmits the update program data again by broadcast in response to the reception of the data request signal.

4. The communication system according to claim 1, wherein the memory includes a user area that is rewritable in which the program data is stored and a system area that is non-rewritable in which an update program for updating the program data is stored, and each of the plurality of communication terminals erases the program data stored in the user area in response to reception of the distribution preparation completion signal and writes the update program data in the user area in response to the reception of the update program data.

5. The communication system according to claim 4, wherein each of the plurality of communication terminals further includes a non-volatile memory that stores an update state flag indicating whether or not the program data is being updated and a rewriting sector number indicating a sector number during rewriting in the user area.

6. The communication system according to claim 5, wherein, in a case in which a reset process is performed during an update process of the program data, each of the plurality of communication terminals reads the update state flag and the rewriting sector number from the non-volatile memory, and in a case in which the update state flag indicates that the program data is being updated, each of the plurality of communication terminals erases data of a sector in the user area indicated by the rewriting sector number and performs the retransmission for transmitting the start request signal to the host device again.

7. The communication system according to claim 1, wherein each of the plurality of communication terminals has a sensor, and transmits detection information detected by the sensor to the host device according to the program data stored in the memory.

8. A communication system comprising:
   a plurality of communication terminals each having a memory storing program data in charge of information communication; and
   a host device that communicates with the plurality of communication terminals,
   wherein each of the communication terminals transmits a start request signal to the host device in a case in which a distribution preparation completion signal indicating that preparation for distribution of update program data is completed is received from the host device, and transmits a data request signal to the host device in a case in which a permission signal for giving a right for performing a data request is received from the host device, and
   the host device transmits the distribution preparation completion signal by anycast to only each of the communication terminals belonging to one desired group when the plurality of communication terminals are divided into n (where n is an integer equal to or greater than two) groups, and then the host device transmits the permission signal to one communication terminal that has transmitted the start request signal earliest, and transmits the update program data by anycast to only each of the communication terminals belonging to the one group in response to reception of the data request signal.

9. A program update method of a communication system comprising a plurality of communication terminals each having a memory storing program data in charge of information communication, and a host device that communicates with the plurality of communication terminals, the program update method comprising:
   transmitting, by the host device, a distribution preparation completion signal indicating that preparation for distribution of update program data is completed by broadcast;
   transmitting, by each of the plurality of communication terminals, a start request signal to the host device in response to reception of the distribution preparation completion signal;
   transmitting, by the host device, a permission signal for giving a right for performing a data request to one communication terminal that has transmitted the start request signal earliest among the plurality of communication terminals;
   transmitting, by the one communication terminal, a data request signal to the host device in response to reception of the permission signal; and
   transmitting, by the host device, the update program data by broadcast to the plurality of communication terminals in response to reception of the data request signal.

* * * * *